United States Patent [19]

Burris et al.

[11] Patent Number: 4,720,857
[45] Date of Patent: Jan. 19, 1988

[54] MINIATURIZED HEADSET FOR TWO-WAY VOICE COMMUNICATION

[75] Inventors: Christine Burris, Felton; Robert L. Harris, Rio Del Mar; Victor Kolough; Larry R. Linville, both of Santa Cruz; Charles G. Scott, Aptos; Robert Young, Santa Cruz, all of Calif.

[73] Assignee: Plantronics, Inc., Santa Cruz, Calif.

[21] Appl. No.: 805,907

[22] Filed: Dec. 6, 1985

[51] Int. Cl.⁴ .............................................. H04M 1/05
[52] U.S. Cl. ...................................... 379/430; 381/187
[58] Field of Search ............ 179/111 E, 121 D, 121 R, 179/180, 182 R, 182 A, 156 A, 156 R, 107 A; 379/430, 433; 381/183, 187, 68.6

[56] References Cited

U.S. PATENT DOCUMENTS

| | | |
|---|---|---|
| 1,614,987 | 1/1927 | Langenbeck et al. |
| 1,893,143 | 1/1933 | Koch. |
| 1,953,437 | 4/1934 | Schier. |
| 2,487,038 | 11/1949 | Baum. |
| 2,489,277 | 11/1949 | Faralla. |
| 3,440,365 | 4/1969 | Bryant et al. ........................ 379/439 |
| 3,524,951 | 8/1970 | Bernardi et al. ..................... 379/430 |
| 3,586,794 | 6/1971 | Michaelis. |
| 3,610,841 | 10/1971 | Hutchings ............................ 379/430 |
| 3,691,319 | 9/1972 | Bee ....................................... 379/430 |
| 3,781,492 | 12/1973 | Cragg et al. ......................... 379/430 |
| 3,819,860 | 6/1974 | Miller. |
| 3,862,378 | 1/1975 | Norris .................................. 379/430 |
| 3,934,100 | 1/1976 | Harada ................................. 181/135 |
| 4,020,297 | 4/1977 | Brodie .................................. 379/430 |
| 4,273,969 | 6/1981 | Foley et al. .......................... 379/430 |
| 4,375,016 | 2/1983 | Harada. |
| 4,403,120 | 9/1983 | Yoshimi ............................... 381/187 |
| 4,420,657 | 12/1983 | Larkin .................................. 379/430 |
| 4,443,668 | 4/1984 | Warren ................................. 381/154 |
| 4,564,955 | 1/1986 | Birch et al. .......................... 381/68.7 |
| 4,588,867 | 5/1986 | Konomi ................................ 379/430 |

FOREIGN PATENT DOCUMENTS

| | | |
|---|---|---|
| 0143383 | 10/1981 | European Pat. Off. . |
| 1363723 | 8/1974 | United Kingdom. |
| 2078057 | 5/1981 | United Kingdom. |
| 2082020 | 6/1981 | United Kingdom. |
| 2141903 | 1/1985 | United Kingdom. |

Primary Examiner—Jin F. Ng
Assistant Examiner—Danita R. Byrd
Attorney, Agent, or Firm—Michael T. McLemore

[57] ABSTRACT

A miniaturized headset for two-way voice communication is supported and positioned by the notch in the concha portion of a wearer's ear. The headset is reversible and may be worn on either the left or right ear. The earpiece includes sound output ports located therein to provide for alignment of a port with the auditory canal of either of the headset wearer's ears. The earpiece is disposed within the concha of the wearer's ear and outside the auditory canal.

17 Claims, 12 Drawing Figures

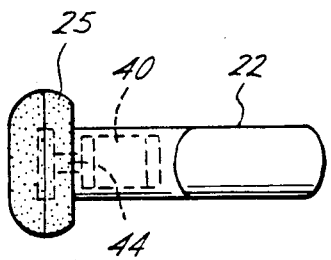
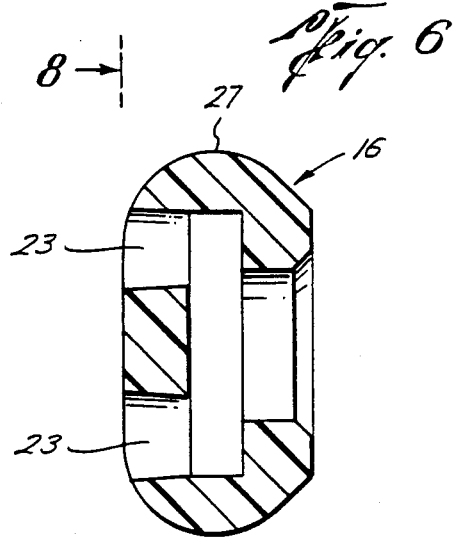
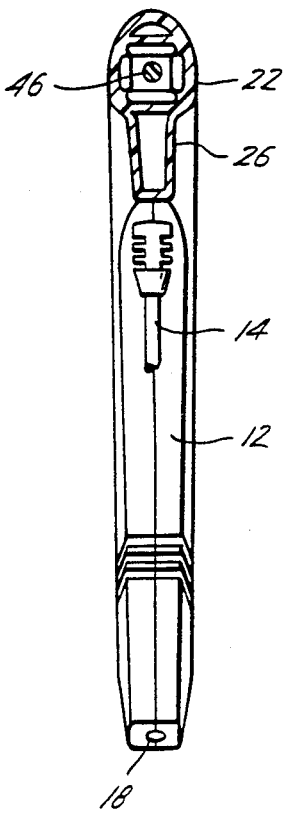
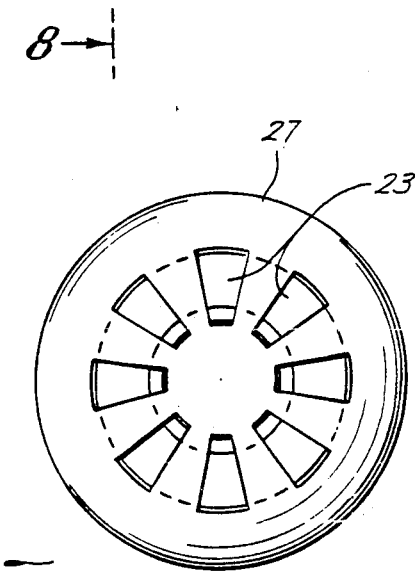
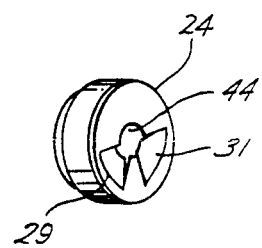

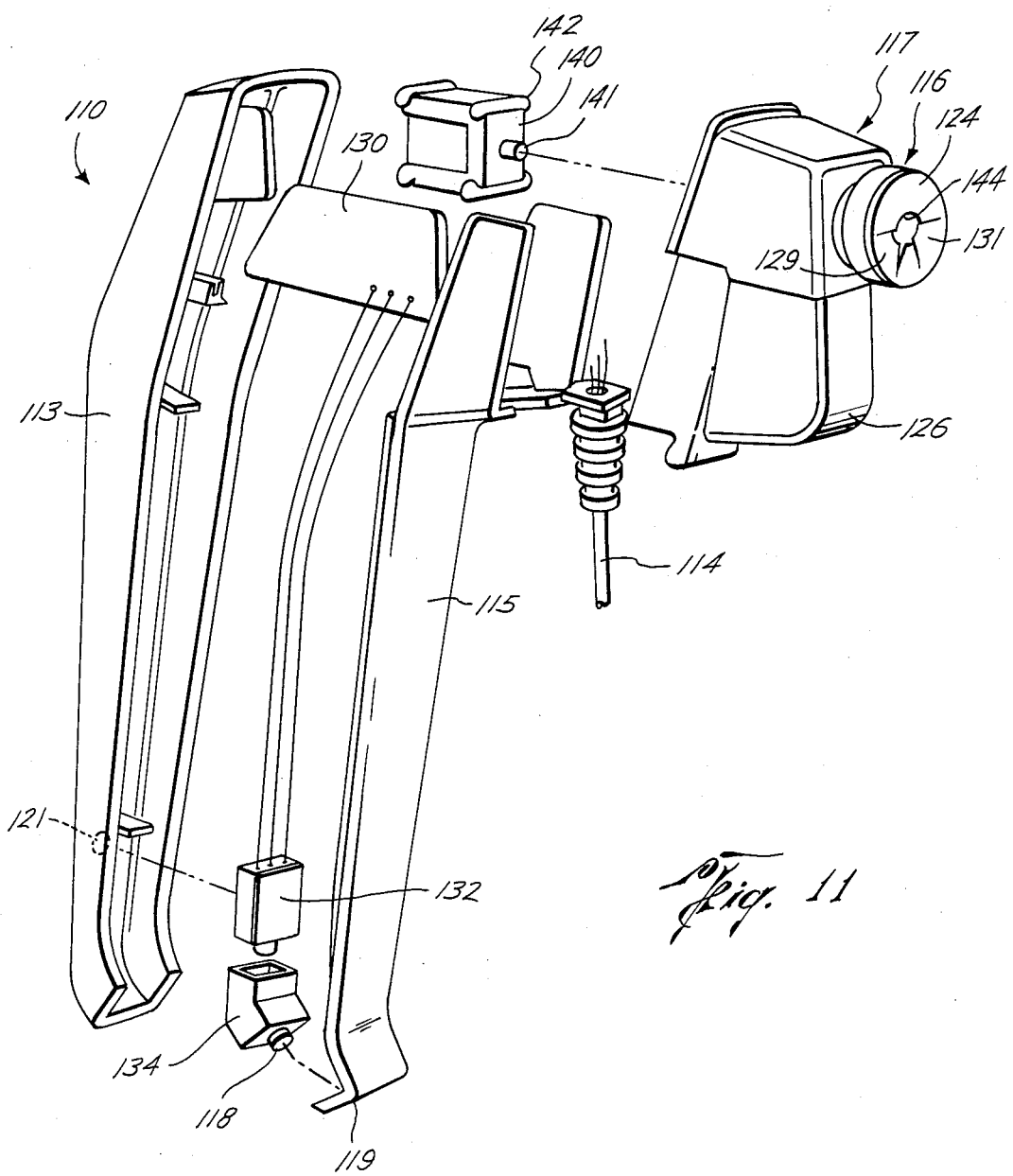

MINIATURIZED HEADSET FOR TWO-WAY VOICE COMMUNICATION

FIELD OF THE INVENTION

This invention relates to headsets for two-way voice communication, such as might be used by telephone operators, aircraft pilots, air-traffic controllers, etc. and more particularly, it relates to a headset supported and positioned by the concha of the human ear.

BACKGROUND OF THE INVENTION

It has long been known that headsets for two-way voice communication can advantageously be constructed from small, lightweight components in a miniaturized form wherein receive and transmit transducers are placed in a capsule mounted near the user's ear. Speech is conducted to a microphone transducer via an acoustic tube positioned near the user's mouth, while incoming communications emanating from a receive transducer are conducted to the user's ear via a second acoustic tube. Various miniature headsets have employed the so-called "post-auricle" configuration, wherein the transducers are placed in a capsule which is mounted behind the ear of the user, and is shaped to fit generally along the saddle area behind the ear. For example, U.S. Pat. No. 3,548,118, issued Dec. 15, 1970, to K. J. Hutchings, discloses such a post-auricle arrangement, with an acoustic voice tube passing over the ear and into the headset capsule, and an acoustic ear tube passing from the capsule under the wearer's ear and up into the ear canal. The arrangement disclosed in the Hutchings patent is embodied in a headset commercially sold by Plantronics, Inc., the assignee of the present application, under its trademark STARSET ®.

It has also been known, of course, to provide hearing-aid devices and earphones having "in-the-ear" adapters which are held in the concha of the ear. These adapters are typically custom-molded for either the right or the left ear of a particular individual wearer.

The aforementioned post-auricle headset designs have attempted to provide positioning by means of a horn or projection which extends over the top of and engages the top of the ear to hold the capsule in place behind the ear. The "in-the-ear" adapters for hearing-aids and earphones are positioned by means of contours and projections molded to fit the ear; or by means of projections for engaging the fleshy convolutions of the concha of the ear.

SUMMARY OF INVENTION

The present invention provides a miniaturized headset for two-way voice communication which is supported and positioned by the notch in the concha portion of a wearer's ear. Further, the headset is reversible in that it may be worn on either the left or right ear. In utilizing the notch of the concha of the human ear, the earpiece portion for disposition within the wearer's ear includes sound output ports located in the earpiece to provide for alignment of a port with the auditory canal of the wearer's ear regardless of which ear the earpiece is disposed. Accordingly, in the present invention, concentrated sound pointed into the auditory canal is provided by virtue of the observation that the angular relationship between the concha notch and the ear canal is approximately the same for all persons. The result is that a universal miniature headset for two-way voice communication is realized.

A two-way voice communication headset in accordance with the present invention includes a housing having means, including a microphone, for converting the wearer's speech to electrical signals and means, including a receiver, for converting received electrical signals into sounds. Additionally, the headset includes means for conveying sounds from the receiver to the wearer's ear. This includes an earpiece for disposition in the concha of either a wearer's left or right ear and outside the auditory canal. For reversibility, the earpiece has sound output ports located therein to provide for alignment of a port with the auditory canal of the wearer's ear regardless of which ear the earpiece is disposed. Means coupled to the earpiece for engaging the notch portion of the concha of either of the wearer's ears establishes rotational positioning of the earpiece relative to the wearer's ear. The means may be carried on the headset housing so as to support the housing from the wearer's ear. The means may further provide placement of the microphone in an orientation directed toward the headset wearer's mouth.

BRIEF DESCRIPTION OF THE DRAWINGS

A written description setting forth the best mode presently known for carrying out the present invention, and of the manner of implementing and using it, is provided by the following detailed description which references the attached, drawings wherein;

FIG. 4 is a diagram of the topside view of the headset of FIG. 1;

FIG. 5 is a frontal view of the headset of FIG. 1;

FIG. 6 is a cross-section view of the earpiece portion of the headset of FIG. 1;

FIG. 7 is a view of the earpiece holder;

FIG. 8 is a frontal view of the earpiece portion of the headset of FIG. 1;

FIG. 11 is a perspective view of an alternate embodiment of a headset in accordance with the present invention.

DETAILED DESCRIPTION

Figure 2:
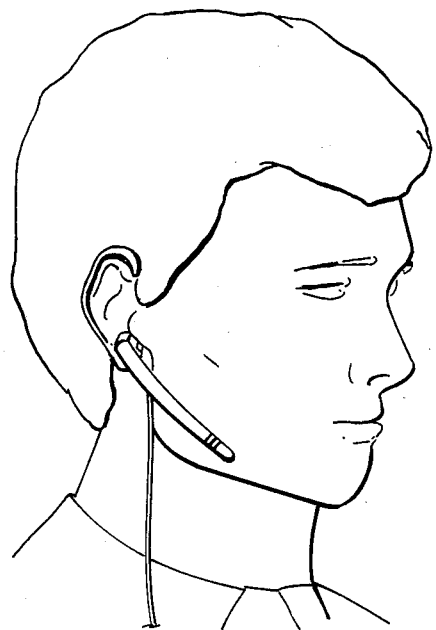
FIG. 2 is a diagram illustrating the position of the headset on a wearer.
Figure 1:
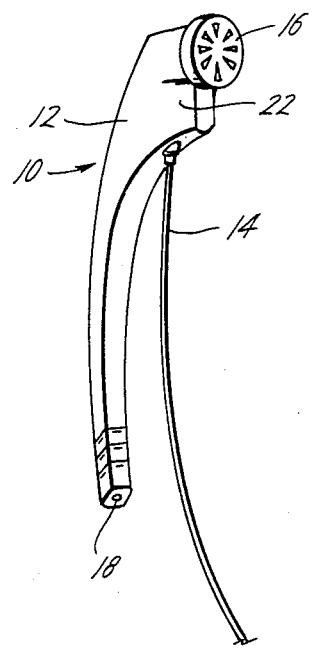
FIG. 1 is a perspective illustration of a concha-fitting headset in accordance with the present invention.

Referring first to FIGS. 1 and 2, a miniature headset for two-way voice communication is generally indicated by the reference numeral 10. The headset includes a housing 12 containing a receiver transducer for reception of electrical signals via wires in cable 14 and conversion of these signals to sound. The receiver's sound signals are conveyed through earpiece assembly 16 to the wearer's ear. Earpiece assembly 16 is for disposition within the concha of a wearer's ear. Moreover, the earpiece assembly may be disposed in either a wearer's left or right ear. Additionally, it is to be noted that the earpiece assembly itself although carried within the concha of the ear is disposed outside the auditory canal. That is, the earpiece assembly does not have a projecting portion for insertion within the auditory canal.

The headset housing 12 also contains a microphone transducer for converting voice signals to electrical signals, which are then conveyed by means of wires in cable 14 to a suitable amplification device, and thence onto a telephone line, or other communication link. Voice signals of the wearer's speech are conveyed to the microphone transducer through an opening port 18 in the lower end of the housing. Alternatively, an acoustic tube or a boom microphone arrangement might be suspended from the lower end of the housing. Preferably, the microphone is a unidirectional type.

As shown in the drawing of FIG. 2, the headset housing is supported from the wearer's ear. Specifically, the support is provided by means on the housing for engaging the notch portion of the concha of the ear. Furthermore, rotational positioning of the earpiece assembly relative to the wearer's ear is established by using the notch portion of the concha as a reference relative to the auditory canal of the wearer's ear. The present invention recognizes and utilizes the fact that there is a generally universal relationship within a narrow tolerance between the notch portion of an ear and the auditory canal. Thus, by having means for engaging the notch portion of the ear concha, it is possible to accurately locate the earpiece assembly 16 relative to the ear canal.

Figure 3:
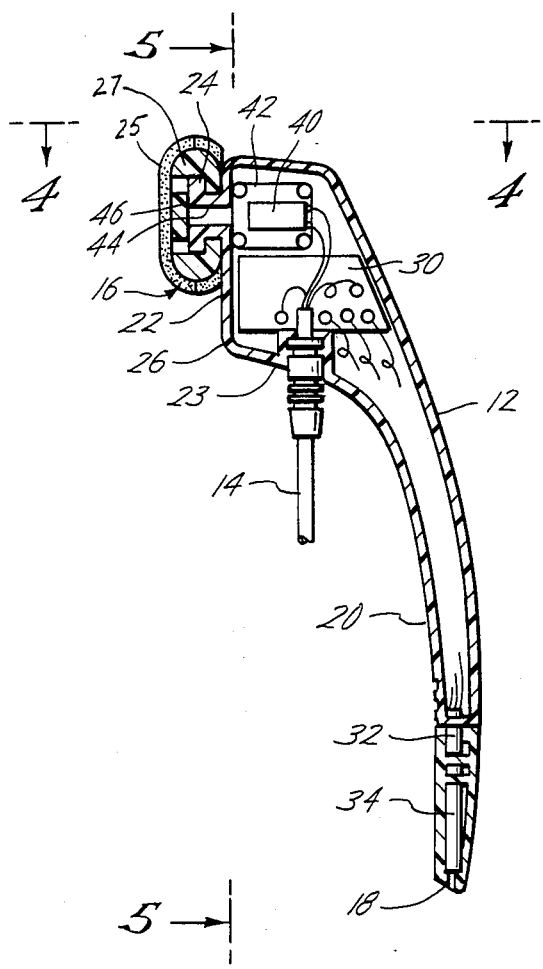
FIG. 3 is a schematic diagram of the internal components layout in the housing of the headset of FIG. 1.

Referring now to FIGS. 3–5, details of the construction of headset 10, particularly the housing and components contained therein, are shown. Housing 12 includes mating left and right sides. The lower end of housing 12 includes an opening 18 to permit the entry of sounds from a wearer's speech. Above the lower end, a front portion 20 is provided for disposition adjacent the wearer's cheek when the earpiece assembly is disposed within the wearer's ear. The upper end of housing 12 includes a projecting front portion 22. Connected to this projecting front portion is an earpiece holder 24 providing a sound communication path to and through the earpiece 27 which receives thereon a foam earpiece cover 25. In the embodiment being described, the earpiece assembly 16 is considered to include the composite structure of earpiece holder 24 and earpiece 27, and optionally earpiece cover 25. A shoulder 26 is formed by housing 12 between the lower end of the earpiece assembly and the front portion of the housing where planar front surface 22 curves toward arcuate portion 23. It is this shoulder which engages the notch portion of the concha of either of a wearer's ears to establish the rotational positioning of the earpiece relative to the wearer's ear and to support the housing in such a manner that the microphone port 18 is oriented toward the wearer's mouth.

Referring now specifically to FIG. 3, it will be observed that the wires within cable 14 connect to a printed circuit board 30 containing conductors and components for connection to a microphone 32 disposed near the lower end of housing 12. The microphone may be an electret microphone operating on the principle of converting sound into changes of an electrical field between a metallic diaphragm and a metal back plate, which operate together as a capacitor. A unidirectional type microphone is preferred. For example, a Model No. 1340 microphone available from LECTRET is suitable. Sound is conducted to the electret microphone by way of a short piece of elastomeric tubing 34.

A magnetic or dynamic receiver 40 is fitted in an elastomeric boot 42 placed in the headset housing half in the space formed within portion 22. Wire leads are employed to conduct electrical signals from wires in the headset cable 14 to the receiver 40. Sounds are conveyed from receiver 40 to earpiece 27 through a sound tube extension 44 formed within the earpiece holder 24 surrounding said extension 44 on said receiver 40, said earpiece holder 24 having a port 46. An elastomeric coupler (not shown) may be used to connect the receiver 40 to the sound tunnel in earpiece holder 24.

Referring now to FIGS. 6–8, views of earpiece 27 illustrating its construction are shown. Specifically, FIG. 8 is a front view of earpiece 27 showing provision therein of openings 23. These openings are radial slots offset from the center of the earpiece.

In FIG. 6, a cross-sectional view of earpiece 27 is presented. In this view, earpiece 27 is shown to be of a substantially circular, tablet-like configuration. Further, the internal structure of earpiece 27 permits engagement of earpiece holder 24 in a wrap around arrangement.

Earpiece 27 is suitably made of a pliable, molded material so that it is readily placed on and removed from earpiece holder 24. It will further be appreciated that the dimensions of earpiece 27 in terms of its diameter and overall size can be varied to provide for a snug and comfortable fit within an individual wearer's ear.

In FIG. 7, earpiece holder 24 is shown. Earpiece holder 24 has formed therein two sound output ports 29 and 31. The earpiece holder 24 may be integrally formed with a housing as, for example, in a one-piece molded plastic part. Earpiece holder 24 is shown in a cylindrical, disc-like configuration. The sound ports are in communication with tunnel 44 extending through holder 24 and are formed as generally arcuate-shaped slots. Each slot extends over its length through an angle of approximately 60°. The separation between the slots is also approximately 60°. Thus, when the earpiece is disposed in either of a wearer's ears, a sound output port is placed in alignment with the auditory canal.

Figure 9:
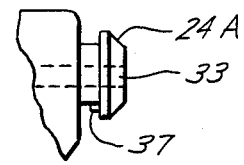
FIGS. 9 and 10 show an alternate arrangement for the earpiece holder and earpiece.
Figure 10:
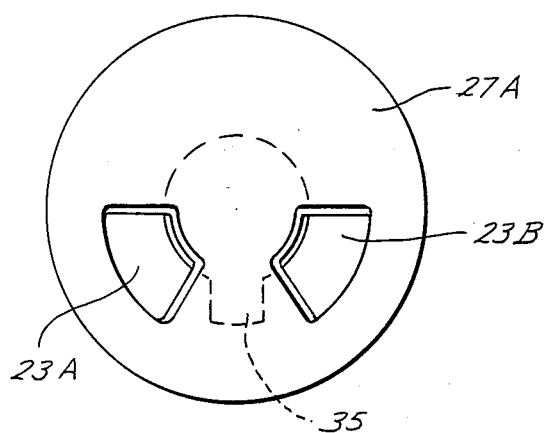

An alternative arrangement for the earpiece assembly 16 is shown in FIGS. 9 and 10. In this embodiment, the earpiece holder 24A has a single sound output opening 33 at its distal end. This is in contrast to the two spaced-apart sound output ports 29 and 31 in FIG. 7. The earpiece 27A which is placed on earpiece holder 24A includes two spaced-apart arcuate openings 23A and 23B serving as a pair of sound output ports. These openings are located on the earpiece 27A in a fashion similar to that of the sound ports 29 and 31 in earpiece holder 24 of the embodiment shown in FIG. 7. In order to establish accurate rotational positioning of the two openings 23A and 23B relative to the shoulder portion of the headset housing to be received in the concha notch of a wearer's ear, the earpiece 27A includes a notch 35 for engaging detent 37 on holder 24A. Registration of the detent and notch locates the earpiece 27A on holder 24A. Thus, the sound openings 23A and 23B will be properly located for alignment with the auditory canal of a wearer's ear when the earpiece 16 is disposed in the ear.

Referring next to FIG. 11, there is shown an alternate embodiment of a headset in accordance with the present invention utilizing a housing 110 comprising a back cover portion 113, a front cover portion 115 and a top portion 117. This housing configuration is an alternative to that shown in the embodiment of FIGS. 1–5 in which the housing 12 comprises mating left and right side portions. As represented in FIG. 11, a cable 114 is held within housing 110 between front cover portion 115 and top portion 117. The wires within cable 114 connect to a printed circuit board 130 containing conductors and components for connection to a microphone 132 disposed near the lower end of housing 110. Again, the microphone is preferably an electret microphone and may be of a cardiod-type. Sounds conducted to the microphone 132 by way of a connecting boot 134 having a sound input port 118 that extends through a bottom surface 119 of front cover 115. A rear port 121 is also provided in the case of a conferencing microphone arrangement.

At the upper end of housing 110 is a receiver 140 fitted in a rubber boot 142. Wire leads are employed to conduct electrical signals from wires in the headset cable 114 to the receiver 140. Sounds are conveyed from receiver 140 to earpiece assembly 116 through sound output port 141 which is coupled to a tunnel (not shown) formed in top cover portion 117. The tunnel extends through earpiece holder 124 to sound output ports 129 and 131.

Formed as a part of top cover portion 117 is shoulder 126 for engaging the notch portion of the concha of a wearer's ear. Shoulder 126 establishes rotational positioning of the earpiece relative to the wearer's ear, serves to support the housing, and locates the microphone close to the wearer's mouth.

Earpiece holder 124 is shown in FIG. 11 without the earpiece and cover portions. That is, only the earpiece holder is in view to reveal the molded-in sound output ports. It will be appreciated that the embodiment of FIG. 11 may have the earpiece assembly implemented in the alternate manner shown in FIGS. 9 and 10 previously described.

Figure 12:
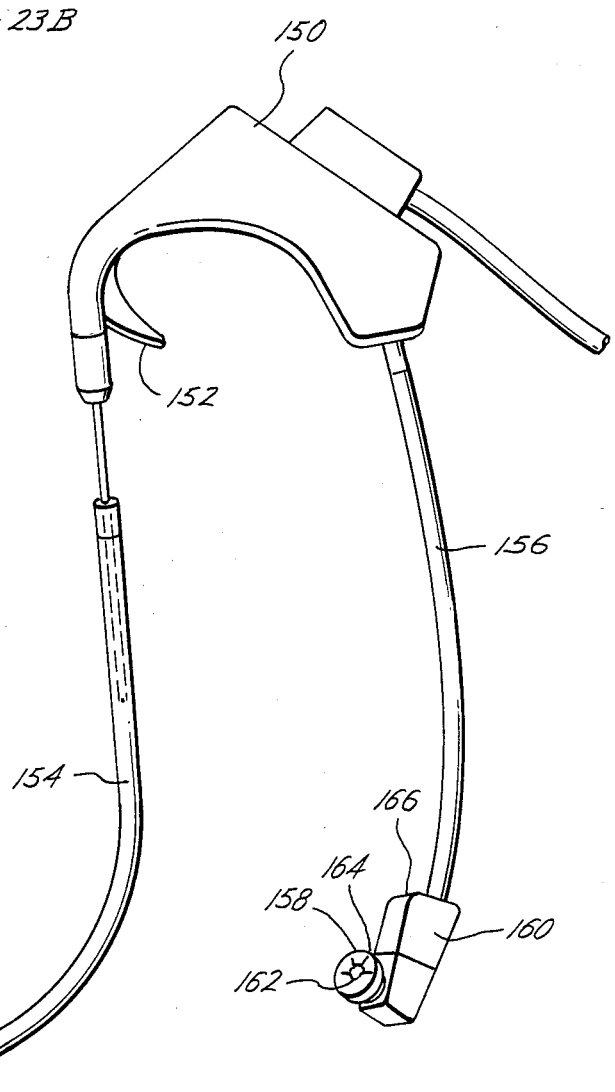
FIG. 12 is a diagram of a post-auricle headset utilizing the earpiece of the present invention.

Referring now to FIG. 12, there is shown a miniature headset of the "post-auricle" configuration. The headset includes a housing 150 which fits behind the ear. The top of the housing includes a horn projection 152 which extends over the top of and engages the top of ear to hold the housing in place behind the ear. The top of the housing supports an extendable voice tube 154 which projects forth from the top of the ear towards the mouth of the user with the distal end adjacent the mouth. A flexible acoustic tube 156 is secured to the bottom of the housing and provides communication between the auditory canal of the ear and the receiver within the housing. At the end of the acoustic tube is a structure for establishing sound communication between the acoustic tube and the auditory canal of a wearer's ear. This structure in accordance with the present invention includes an earpiece holder 158 carried on a housing 160. An internal sound tunnel through housing 160 directs sound from tube 156 to sound output ports 162 and 164 in assembly 158. It will be appreciated that the structure of assembly 158 corresponds to that shown in the headsets of FIGS. 1-5 and FIG. 11, or to the alternate arrangement shown in FIGS. 9 and 10. Similarly, the housing 160 generally corresponds to the structure of the top housing portion 117 shown in the embodiment of FIG. 11. The structural arrangement of the shoulder portion 26 in the embodiment of FIGS. 1-5 could also be suitably utilized.

In use, earpiece assembly 158 is disposed within the concha of either a wearer's left or right ear and outside the auditory canal. The two sound output ports 162 and 164 provide for reversibility and permit alignment of a port with the auditory canal of the wearer's ear regardless of which ear the assembly is placed. The shoulder 166 formed on housing 160 engages a notch portion of the wearer's ear to establish rotational positioning of the assembly relative to the wearer's ear. Although the assembly 158 is shown in FIG. 12 without an earpiece and cover, both are to be used.

The foregoing description of the invention has been directed to illustrative embodiments for purposes of explanation and illustration. It will be apparent, however, to those skilled in this art that many modifications and changes in the apparatus may be made without departing from the scope of the invention. For example, the housing configuration may be of any number of different forms. Also, the arrangement for mounting the microphone and receiver transducers within the headset housing may be varied from that shown in the drawings of the illustrative embodiment. For example, the microphone may be mounted remote from the housing, such as on a lapel clip or on the headset cable. In the post-auricle embodiment, the receive transducer may be located in the housing to which the earpiece assembly is mounted rather than in the behind-the-ear capsule. These, and other variations will be apparent to those skilled in the art. It is the Applicants' intention of the following claims to cover all equivalent modifications and variations as fall within the scope of the invention.

What is claimed is:

1. A two-way voice communication headset, comprising:
   a housing;
   means, including a microphone, connected to said housing, for converting a wearer's speech to electrical signals;
   means, including a receiver, connected to said housing, for converting received electrical signals into sounds;
   means including an earpiece assembly carried by said housing, for conveying sounds from the received signal converting means to the wearer's ear;
   said earpiece assembly adapted to fit within the concha of either a wearer's left or right ear and outside the auditory canal;
   said earpiece assembly including a pair of sound output ports, one of the ports being in alignment with the auditory canal of the wearer's ear regardless of which ear the earpiece is disposed; and
   means carried on said housing, for engaging the notch portion of the concha of either of a wearer's ears to support the housing from the wearer's ear and establish rotational positioning of the earpiece assembly relative to the wearer's ear.

2. The headset of claim 1 wherein said earpiece assembly comprises an earpiece holder attached to said housing, an earpiece and an earpiece cover of a substantially circular configuration disposed over said earpiece.

3. The headset of claim 2 wherein the sound output ports are spaced-apart arcuate openings.

4. The headset of claim 2 wherein the sound output ports are formed in the earpiece holder.

5. The headset of claim 2 wherein the sound output ports are formed in the earpiece.

6. A two-way voice communication headset, comprising:
   an elongated housing having an opening in the lower end to permit the entry of sounds from a wearer's speech and an opening in the upper end to permit the exit of sounds to the wearer's ear;
   means, including a microphone, disposed within the housing proximate sound entry opening in the lower end thereof, for converting the wearer's speech to electrical signals;

means, including a receiver, disposed within the housing proximate the upper end thereof, for converting received electrical signals into sounds and conveying the sounds to the sound exit opening;

an earpiece assembly carried by said housing proximate the sound exit opening at the upper end thereof, for conveying sounds to the wearer's ear;

said earpiece assembly adapted to fit within the concha of the wearer's ear and outside the auditory canal;

said earpiece assembly including a pair of output ports disposed to provide for alignment of a port with the auditory canal of the wearer's ear regardless of which ear the earpiece assembly is disposed; and a shoulder formed on the upper end of the housing adjacent the earpiece for engaging the notch portion of the concha of the wearer's ear to establish rotational positioning of the earpiece assembly relative to the wearer and to support the housing from the wearer's ear.

7. A two-way voice communication headset, comprising:

a housing;

means, connected to said housing and including a microphone, for converting the wearer's speech to electrical signals;

means, connected to said housing and including a receiver, for converting received electrical signals into sounds;

an earpiece assembly carried by said housing, for conveying sounds from the received signal converting means to the wearer's ear;

said earpiece assembly including an earpiece member adapted to fit within the concha of either a wearer's left or right ear and outside the auditory canal;

said earpiece member including a pair of sound output ports disposed to provide for alignment of a port with the auditory canal of the wearer's ear regardless of which ear the earpiece is disposed; and means carried on said housing, for engaging the notch portion of the concha of either of a wearer's ears to support the housing from the wearer's ear, establish rotational positioning of the earpiece relative to the wearer's ear, and position the microphone near the wearer's mouth.

8. The headset of claim 7 wherein the earpiece assembly further comprises and earpiece holder attached to said housing and an earpiece cover of a substantially circular configuration disposed over said earpiece member.

9. The headset of claim 8 wherein the sound output ports are spaced-apart arcuate openings radially offset from the center of the earpiece member.

10. A two-way voice communication headset, comprising:

a housing;

means, connected to said housing and including a microphone, for converting the wearer's speech to electrical signals;

means, connected to said housing and including a receiver, for converting received electrical signals into sounds;

means including an earpiece assembly carried by said housing, for conveying sounds from the received signal converting means to the wearer's ear;

said earpiece assembly including an earpiece member adapted to fit within the concha of either a wearer's left or right ear and outside the auditory canal and an earpiece holder attached to said housing and mounting said earpiece member;

said earpiece holder including a pair of sound output ports disposed to provide for alignment of a port with the auditory canal of the wearer's ear regardless of which ear the earpiece is disposed; and means carried on said housing, for engaging the notch portion of the concha of either of a wearer's ears to support the housing from the wearer's ear, establish rotational positioning of the earpiece assembly relative to the wearer's ear, and position the microphone near the wearer's mouth.

11. The headset of claim 10 further comprising an earpiece cover of a substantially circular configuration disposed over said earpiece member.

12. The headset of claim 10 wherein the sound output ports are spaced-apart arcuate openings radially offset from the center of the earpiece holder.

13. A two-way voice communication headset, comprising:

a housing;

transmit means, including a microphone, for converting the wearer's speech to electrical signals, said transmit means being connected to said housing;

receive means, including a receiver transducer, for converting received electrical signals into sounds, said receive means being connected to said housing;

means, including an earpiece assembly carried by said housing, for conveying sounds from the receiver transducer to the wearer's ear;

said earpiece assembly adapted to fit within the concha of either a wearer's left or right ear and outside the auditory canal;

said earpiece assembly including a sound output port disposed for alignment with the auditory canal of the wearer's ear regardless of which ear the earpiece is disposed; and means carried on said housing, for engaging the notch portion of the concha of either of a wearer's ears to support the housing from the wearer's ear and establish rotational positioning of the earpiece assembly relative to the wearer's ear.

14. A two-way voice communications headset, comprising:

an elongated housing having an opening in the lower end to permit the entry of sounds from a wearer's speech and an opening in the upper end to permit the exit of sounds to the wearer's ear;

means, including a microphone, disposed within the housing proximate sound entry opening in the lower end thereof, for converting the wearer's speech to electrical signals;

means, including a receiver, disposed within the housing proximate the upper end thereof, for converting received electrical signals into sounds and conveying the sounds to the sound exit opening;

an earpiece assembly carried by said housing proximate the sound exit opening at the upper end thereof, for conveying sounds to the wearer's ear;

said earpiece assembly adapted to fit within the concha of the wearer's ear and outside the auditory canal; and said earpiece assembly including a sound output port disposed for alignment with the auditory canal of the wearer's ear regardless of which ear the earpiece assembly is disposed.

15. A two-way voice communications headset, comprising:

a housing;

transmit means, including a microphone, for converting the wearer's speech to electrical signals, said transmit means being connected to said housing;

receive means, including a receiver, for converting received electrical signals into sounds, said receive means being connected to said housing;

an earpiece assembly carried by said housing, for conveying sounds from the received signal converting means to the wearer's ears;

said earpiece assembly including an earpiece member adapted to fit within the concha of either a wearer's left or right ear and outside the auditory canal;

said earpiece member including a sound output port disposed for alignment with the auditory canal of the wearer's ear regardless of which ear the earpiece is disposed; and means carried on said housing, for engaging the notch portion of the concha of either of a wearer's ears to support the housing from the wearer's ear, establish rotational positioning of the earpiece relative to the wearer's ear, and position the microphone near the wearer's mouth.

16. A two-way voice communication headset, comprising:

a housing;

transmit means, including a microphone, for converting the wearer's speech to electrical signal, said transmit means being connected to said housing;

receive means, including a receiver transducer, for converting received electrical signals into sounds, said receive means being connected to said housing;

means including an earpiece assembly carried by said housing, for conveying sounds from the receive means to the wearer's ear;

said earpiece assembly including an earpiece member adapted to fit within the concha of either a wearer's left or right ear and outside the auditory canal and an earpiece holder attached to said housing and mounting said earpiece member;

said earpiece holder including a sound output port disposed for alignment with the auditory canal of the wearer's ear regardless of which ear the earpiece is disposed; and means carried on said housing, for engaging the notch portion of the concha of either of the wearer's ears to support the housing from the wearer's ear, establish rotational positioning of the earpiece relative to the wearer's ear, and position the microphone near the wearer's mouth.

17. A two-way voice communication headset, comprising:

an elongated housing having an opening in the lower end to permit the entry of sounds from a wearer's speech and an opening in the upper end to permit the exit of sounds to the wearer's ear;

means including a microphone, disposed within the housing proximate sound entry opening in the lower end thereof, for converting the wearer's speech to electrical signals;

means including a receiver, disposed within the housing proximate the upper end thereof, for converting received electrical signals into sounds and conveying the sounds to the sound exit opening;

an earpiece assembly carried by said housing proximate the sound exit opening at the upper end thereof, for conveying sounds to the wearer's ear;

said earpiece assembly being for placement within the concha of the wearer's ear and outside the auditory canal;

said earpiece assembly including a sound output port disposed for alignment with the auditory canal of the wearer's ear; and means disposed at the upper end of the housing adjacent the earpiece for engaging the concha of the wearer's ear to support the housing from the wearer's ear and for engaging the notch portion of the concha to establish positioning of the microphone relative to the wearer's mouth.

* * * * *